Aug. 5, 1969  G. COSCI  3,459,948
PROCESS FOR QUANTITATIVELY MEASURING THE
COLOR DENSITY OF STAINED STRIPS
Filed April 14, 1965  8 Sheets-Sheet 1
Fig. 1
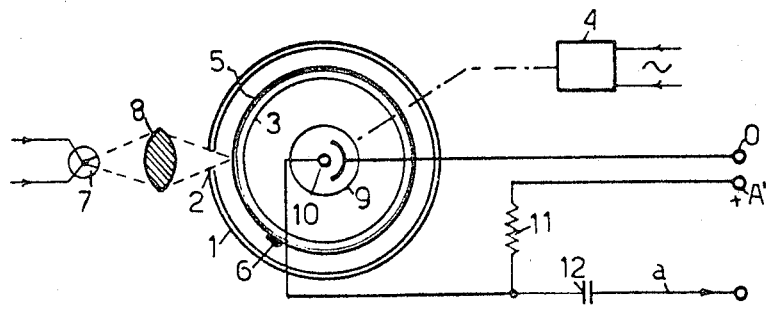
Fig. 2  Fig. 3  Fig. 4
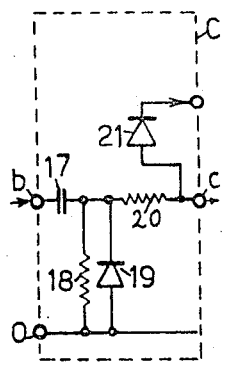 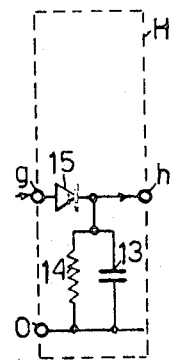 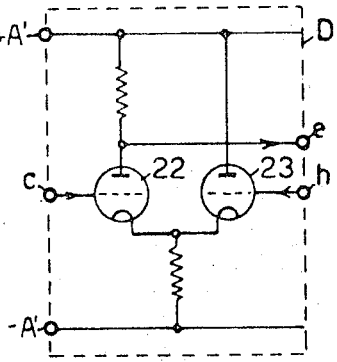
Fig. 5  Fig. 6
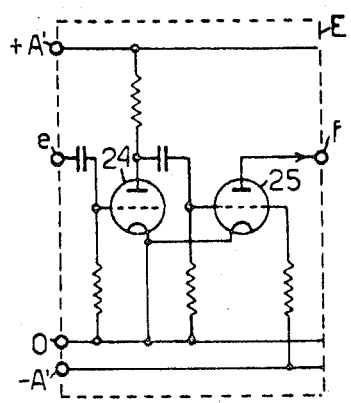 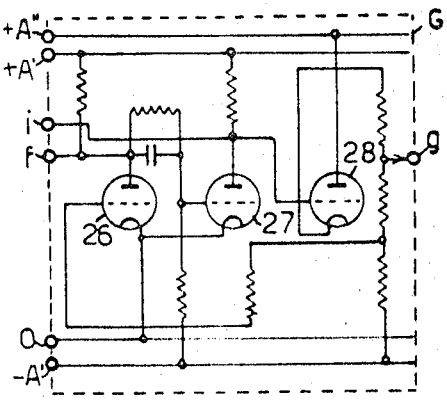
INVENTOR:
GINO COSCI
BY Irvin S. Thompson
ATTORNEY

MULTIVIBRATOR

INVENTOR:
GINO COSCI
BY Irvin S. Thompson
ATTORNEY

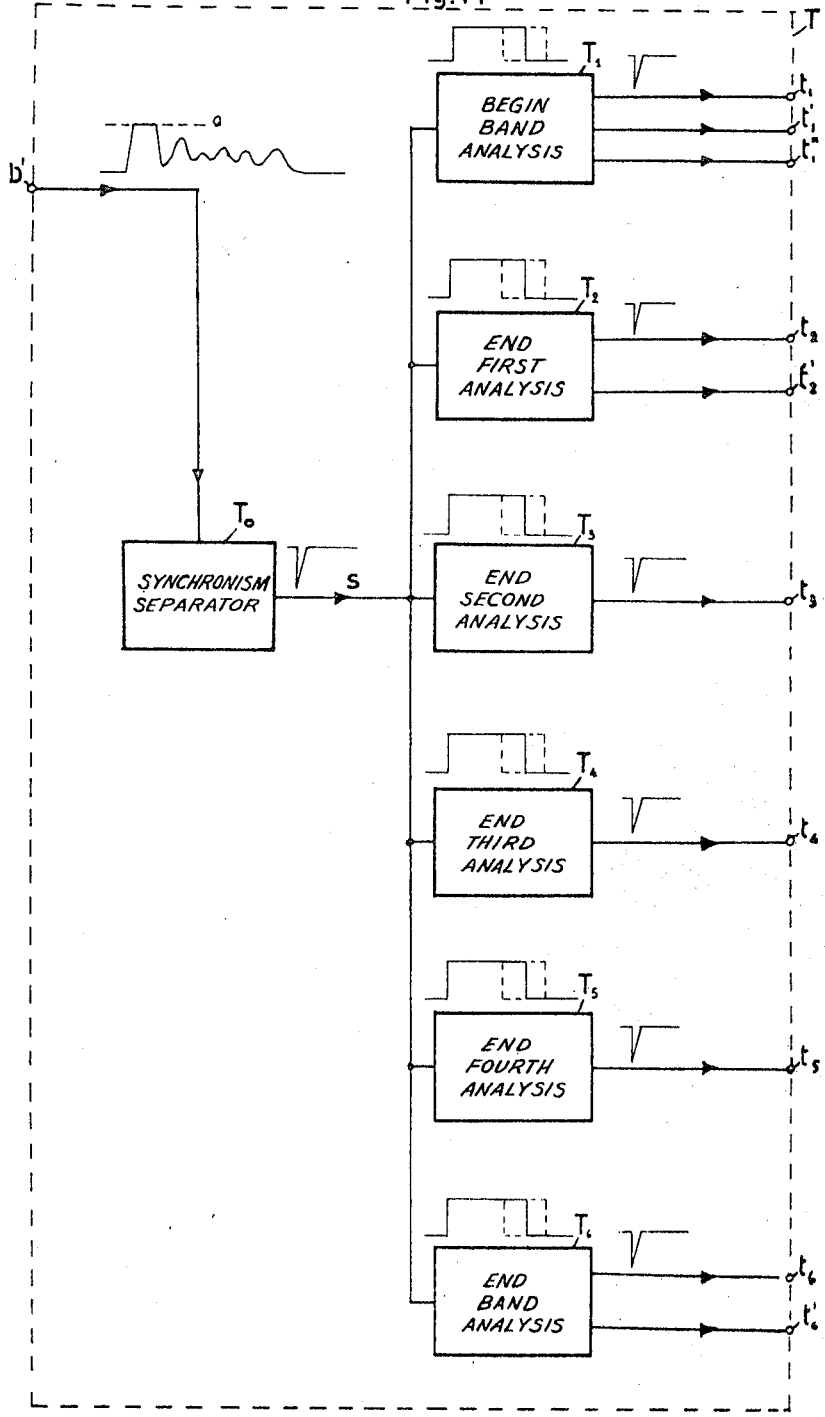

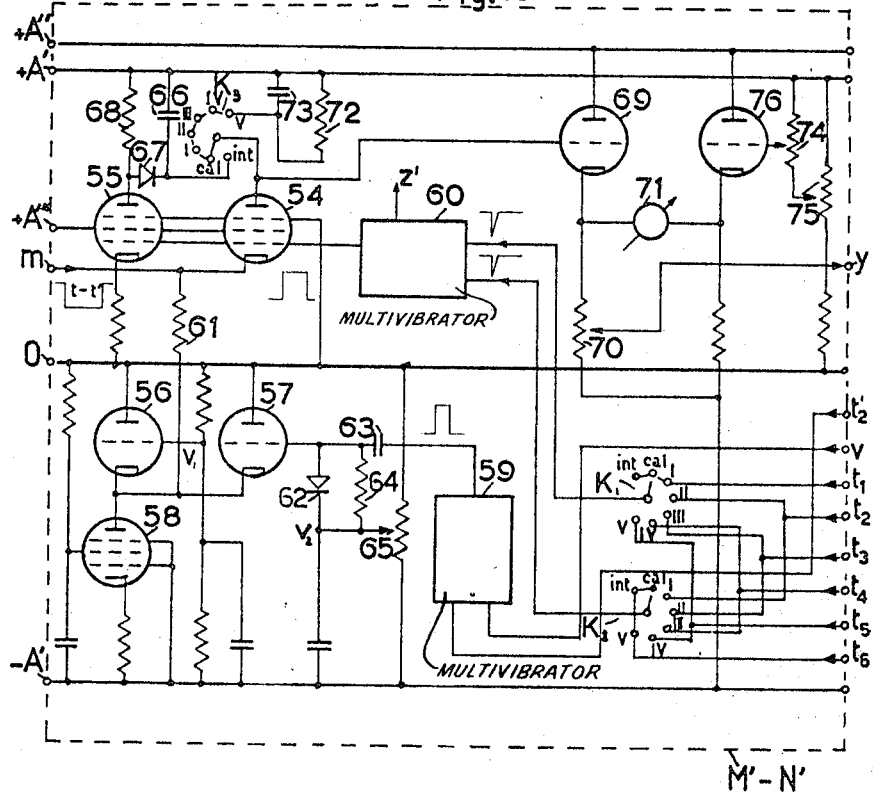
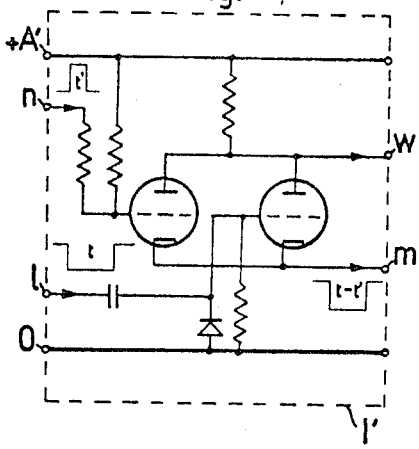
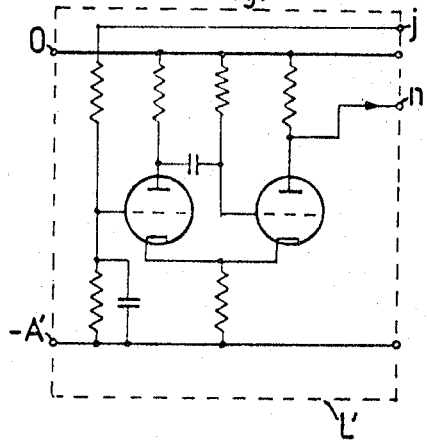

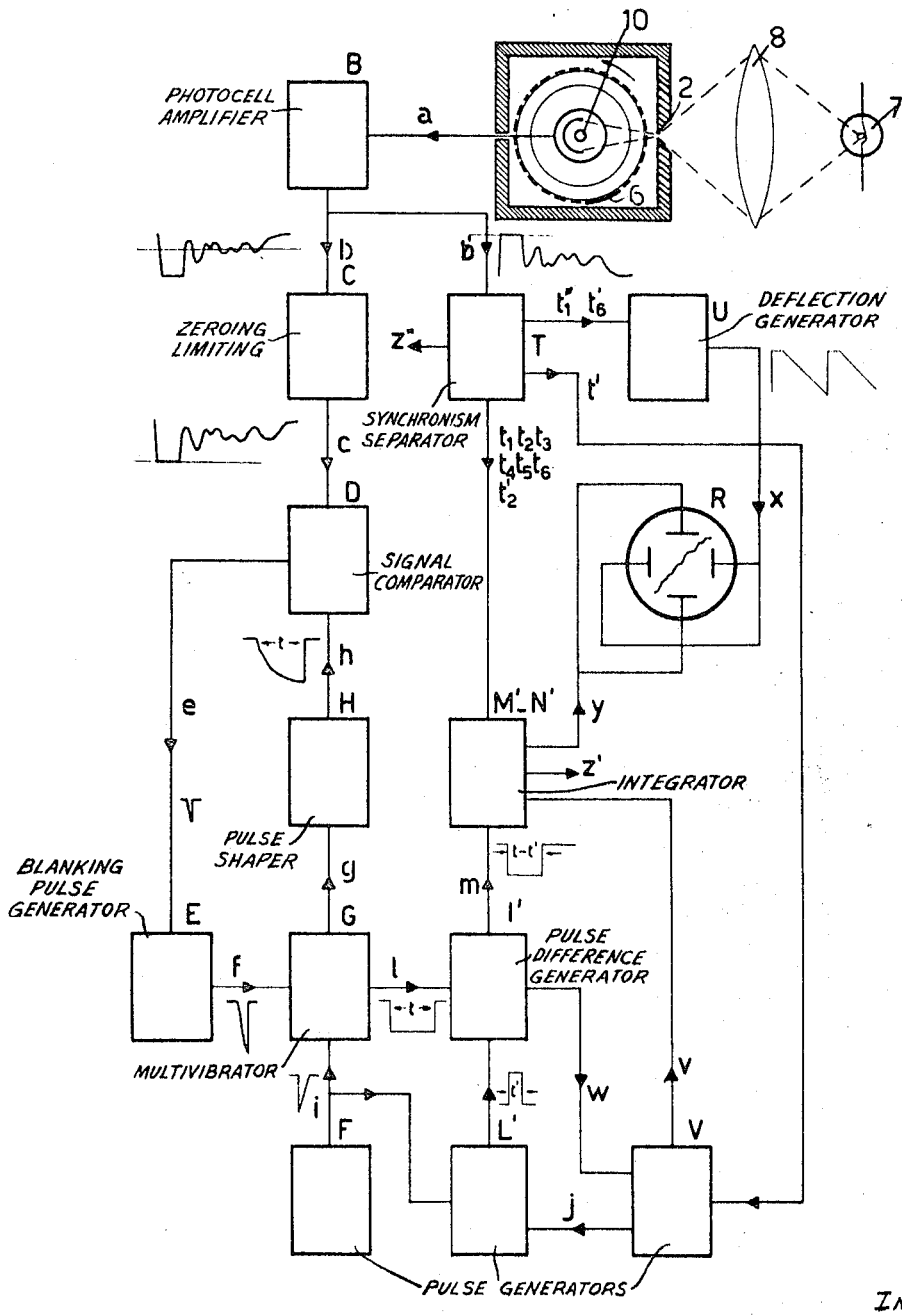

United States Patent Office 3,459,948
Patented Aug. 5, 1969

3,459,948
PROCESS FOR QUANTITATIVELY MEASURING
THE COLOR DENSITY OF STAINED STRIPS
Gino Cosci, % Dr. Mario Pinna, Corso Venezia 35,
Milan, Italy
Filed Apr. 14, 1965, Ser. No. 448,140
Claims priority, application Italy, Apr. 30, 1964,
46,720/64; Mar. 4, 1965, 1,952/65
Int. Cl. G01n 21/30
U.S. Cl. 250—219
6 Claims

ABSTRACT OF THE DISCLOSURE

A process for the quantitative evaluation of the relative amounts of color deposited in bands on a strip such as is produced by several electrophoretic separation systems or other chromatographic processes. The operating principle of the process is the cyclic optical analysis of the strip, the results of the analysis being continuously available. A curve related to the color distribution along the strip is projected on the screen of a cathode ray tube enabling the operator to set suitable integration limits. An electronic computer gives directly the relative amounts of color of the bands of stain, without auxiliary calculations.

---

This invention concerns a densitometric analyzer, more particularly a device intended for determining the amount of a substance that is deposited, e.g. by electrophoresis, on a suitable support (that may be opaque, transulcent or transparent).

A strip of filter paper, saturated with a buffer solution, may be conveniently chosen as a support in the case in question. The substance to be analyzed is placed on said support, and then an electric current is applied, for a given time, to both ends thereof. As a result of the ensuing electrophoresis, the components of which the substance to be analyzed is composed, are moved at a speed that depends on the inherent or acquired electric charges, as well as on the physical dimensions and shape of the molecules. Thus, when the electric field is discontinued, said components will be found scattered throughout the filter paper band, at different distances from the points to which the electric current was applied, depending on the higher or lower migration speed.

The components of a substance may be also deposited on the support not only by electrophoresis, but also owing to capillary filtration phenomena.

To make the analysis more easy, the substance placed on the support may be dyed, preferably by an appropriate specific dye. Then, after the above stated operations, crosswise directed stains, having a deep colored central zone and shaded-off edges will appear on the paper strip. The amount of related, separated fraction is then determined by a densitometric analysis of color.

Such analysis is usually carried out by measuring the absorption (or optical density, or opacity) by means of a slit colorimeter. The strip-shaped support is longitudinally moved across a thin, crosswise directed slit, onto which light is reflected from a suitable source. The transmitted light is received, on the opposite side, by a suitable detector, e.g. by a photocell.

A photocell gives a current response which is directly proportional to the light intensity, which in turn is proportional to the percentage of light transmitted through the support, since no changes in the geometry of the system occur.

The absorption A, as a function of transmission T, is given by:

$$A = \operatorname{Log} \frac{1}{T} = -\log T = \log \frac{100}{T\%} = 2 - \log T\%$$

Thus, a device is needed by which the logarithm of photoelectric current can be calculated.

The amount of dye present in the support section that is lighted by the slit is proportional to optical density, when the support is lighted by a monochromatic light such that the transmission through the support is reduced to a minimum by the utilized dye (Lambert-Beer's Law).

The light-absorption curve, as a function of the support length, is the sum of a plurality of Gauss' bell-shaped curves, each of which is related to a stain on the support. The surface area as defined between each Gauss' curve and the axis of the abscissae, is proportional to the amount of dye present in the related stain. The quotient obtained by dividing the surface area enclosed by a Gauss' curve, by the area of the surface enclosed by the light-absorption curve, will give, after having been multiplied by 100, the percentage of dye that is present in the stain associated with the considered Gauss' curve.

The portion of the support that is located directly before the stained portion is considered as transparent, i.e. a zero-value is attributed to the absorption of the support in this region. In other words, only the color having a density greater than that of the reference portion is calculated.

If the stains are well spaced on the support, then the single Gauss' curves—which form together the absorption curve—are also well spaced. In such a case, the integral absorption curve, as a function of length of band support, is a stepped curve, wherein the height of each step is proportional to the amount of dye that is present in the related stain. If, e.g., the curve is 100 divisions high, then the height of a step will directly represent the percentage of dye present in the stain, or the percentage of the fraction of the substance separately deposited on the support by electrophoresis. Again, if the stains are well spaced, i.e. if a zero absorption exists between any one stain, and the next one, then the beginning and end sections of each step are represented by a tangent parallel to the axis of the abscissae. In the contrary case, the tangent to the flex point between two successive steps is inclined, thus forming an angle with the abscissa axis which is the greater, the deeper is the color between the single stains, i.e. the more overlapped are said stains.

The main feature of the device according to the invention consists in that the percentage of dye present in each stain is read directly on the fluorescent screen of a cathode ray tube.

Another feature of the device according to the invention consists in that the band support, whereon the substance to be analyzed is laid, is cyclically scanned at least ten times—but preferably 25 or 30 times—per second.

According to a further feature of the device according to the invention, the absorption is calculated by means of the exponential discharge of a condenser across a resistance, being the discharge time proportional to the logarithm of the quotient initial voltage/final voltage at the condenser terminal.

According to still another feature of the device according to the invention, means are provided to have the absorptivity zeroed in a predetermined portion of the band support, affording the possibility to change the scanned zone, and with a visual indication on the integral absorption curve.

Another feature of the device according to the invention consists in that, by merely making a few changes in the circuitry, the same device can be made particularly suitable for the analysis of band supports whereon proteins of blood serum (albumin, 1-alpha, 2-alpha, beta and gamma globulin) have been deposited, e.g. by electrophoresis.

Further features of the device according to the invention will appear in the course of the following description.

The densitometric analyzer according to this invention essentially comprises, in combination: means to have a light, produced by a suitable source, collimated and projected onto a narrow, crosswise directed rectangular zone of a band support having a given length (and wherein the substance to be analyzed was previously deposited); means for scanning said band support with said light at a frequency of at least 10 times per second; photoelectric means designed to convert the changes in the light intensity, occurring in the course of said scanning operation, into electric signals; means for discontinuing for a very short time, the emission of said electric signals at the end of each scanning period; an amplifier unit having the input connected with said photocell for amplifying the weak electric signals coming therefrom; a cathode ray tube, comprised of two pairs of deflector plates; an electronic sweep oscillator by which a saw-tooth voltage, synchronized with the frequency at which the band support (carrying the substance to be analyzed) is repeatedly and periodically scanned, is delivered to one of the pairs of deflector plates (and preferably to horizontal ones); electronic means (or the like), respectively connected with the output of said amplifier unit, and with the second pair of deflector plates (preferably to vertical ones) of the cathode ray tube, to impart a constant polarity to the voltage as delivered by said amplifier unit, as well as to deliver to said second pair of deflector plates of the cathode ray tube a voltage corresponding to the integration of electric pulses coming from said amplifier unit; and a feeding unit, by which the required voltages are delivered to the above-stated units. The integral curve of the optical density of stains present on the support being analyzed, is thus obtained on the fluorescent screen of the cathode ray tube.

Two embodiments are foreseen for the electronic means (or equivalent means) that are respectively connected with the output of said amplifier unit associated with the photocell, and to said second pair of deflector plates of the cathode ray tube (for imparting a constant polarity to the voltage delivered by said amplifier unit, and for delivering a voltage conforming to the integration of the electric pulses emitted by said amplifier unit). However, such embodiments mainly differ in the design of circuitry, as well as in the manner by which the different units are connected with one another.

The densitometric analyzer according to the invention will be disclosed in more detail, for a better understanding thereof, in the following description, taken with the accompanying drawings, wherein the wiring diagrams of either single units and of whole systems for both embodiments are shown, the description and drawings as given as non-restrictive examples only. In same the drawings:

FIG. 1 shows, in a merely diagrammatic form, the main devices by which the band support, carrying the substance to be analyzed, is cyclically scanned.

FIG. 2 is the wiring diagram of the "zeroing-limiter unit."

FIG. 3 is the wiring diagram of the unit wherein the exponential pulses are formed.

FIG. 4 is the wiring diagram of the signal comparator unit.

FIG. 5 is the wiring diagram of the blanking pulse generator.

FIG. 6 is the wiring diagram of the bistable multivibrator unit.

FIG. 14 is the wiring diagram of a "synchronism separator and generator of limit pulses of analysis zone" unit.

FIG. 15 is the wiring diagram of the "integrator, and integration cancelling unit," along with the "albumin corrector" and "digital reading" device, such unit being a variant of the units that are separately shown in FIGS. 9 and 10.

FIG. 16 is a wiring diagram of the "pulse-difference generator" unit, said unit being a variant of the unit shown in FIG. 7.

FIG. 17 is the wiring diagram of the "zero-absorption pulse generator" unit, such unit being a variant of that shown in FIG. 8.

FIG. 20 is the general, single-wired diagram of the serond embodiment according to the invention (the feeder unit being omitted).

Figure 7:
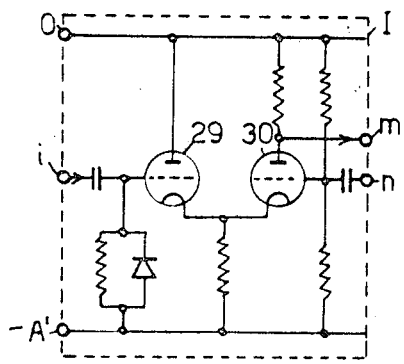
FIG. 7 is the wiring diagram of the impulse-difference generator unit.

The operation of the different units and the electrical connections thereof will become apparent the course of following description.

The wiring diagram of the unit by which the anode or plate voltage as required for the operation of above stated units—that is of the generally known type—is not shown in the drawings. Such feeder unit is able to deliver, e.g. as compared with a zero base value—which is preferably grounded—the following voltages: +500 volts (indicated in the wiring diagrams with the reference sign $+A''$), +300 volts ($+A'$), and −300 v. ($−A'$).

The device diagrammatically shown in FIG. 1 is preferably utilized for the cyclic scanning of a filter paper band support, whereon the substance to be analyzed is previously deposited, e.g. by electrophoresis. Such device consists of a cylindrical casing 1, formed with a side slit 2, and having a transparent cylindrical drum (e.g. of glass) 3 fitted inside of it. Said drum is driven by a synchronous fractional motor 4, at a speed of 25 revolutions per second, when the frequency of the feed voltage is 50 Hz., and at a speed of 30 revolutions per second if the frequency of the feed voltage is 60 Hz.

The filter paper band support 5 is wound around the drum 3, being a strip of light impervious material 6 (e.g. a strip of black paper) applied over the contacting end edges thereof.

The light produced by a source (lamp) 7 fitted outwardly of casing 1 is concentrated and directed onto the band support 5 by a cylindrical lens 8 or the like. A positive potential $+A'$ is applied, through a resistance 11, to the anode 10 of a photocell 9, that is fitted inside of transparent drum 3. The changes in the light intensity, as detected by the photocell 9, are converted into potential variations at the terminals of resistance 11, and collected from a point $a$, downstream of condenser 12.

Figure 13:
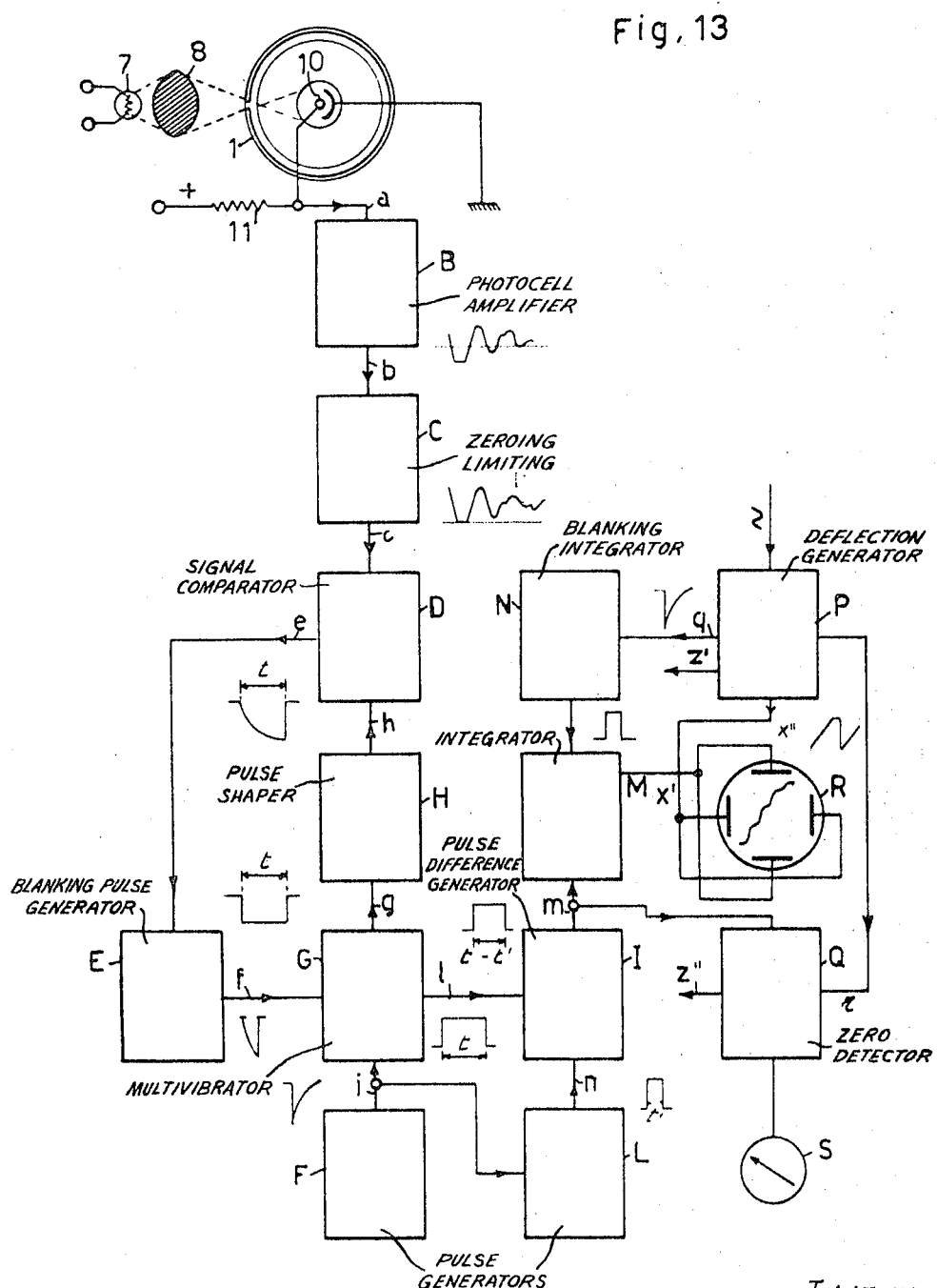
FIG. 13 is the general, single-wired diagram of the first embodiment according to the invention (the feeder unit being omitted).

Such signal is amplified by a conventional amplifier B (see FIG. 13), and its minimal value (that is obtained when the light impervious strip 6, by which as already stated, both ends of band support 5 are sealed on transparent drum 3, is passed across the slit) is zeroed by a "zero adjustment" device C (see FIGS. 2 and 13). Such zero value will be hereinafter called the "zero transmission" value.

The output signal from the above stated zero adjustment device C is received as at $c$, by a "signal comparator" D (FIG. 4) of the differential type, while the signal that is produced by the discharge of condenser 13 onto the resistance 14 is received, as from h, by the "differential pulse shaper" unit H (see FIG. 3).

An "analysis pulse generator" unit F, whose wiring diagram is not shown in the drawings, substantially consists of a conventional multivibrator, and short pulses are given off by it, which are designed to analyze the absorptive power of the band support. Such operation is carried out at intervals corresponding to 0.5 mm. of the total length of said band support 5.

When the bi-stable multivibrator G (see FIG. 6) is triggered by a pulse of said generator F, which is electrically connected therewith through i, said multivibrator is forced or pulsed into another state, whereby a rectangular, negative pulse is started; the diode 15 of the exponential pulse shaper H (see FIG. 3) with which the multivibrator is connected through g, is blocked, and the condenser 13 starts to discharge itself through the resistance 14, whereby the voltage asymptotically approaches zero according to an exponential law.

When the voltage at the terminals of condenser 13 is equal to the voltage of signal comparator D (see FIG. 4) with which the unit H is connected through h, a cancellation pulse is produced, by which the bistable multivibrator G is returned in its initial state (see FIG. 6). The condenser 13 is again charged, taking again its initial value.

Vo being the initial voltage at the terminals of condenser 13, and V the final voltage, then the duration of the pulse produced by the bistable multivibrator G is given by $$t = RC \log \frac{V_o}{V}$$

If the value of voltage, as applied at c to the comparator, is Vo, in correspondence to the portion of band support 5 (FIG. 1) in which the absorptivity is zero, V being the value related to transmission T; then it will be:

$$T = \frac{V}{V_o}$$

Thus, the duration of pulses is proportional to the absorptivity.

In the device according to the invention, the condenser 13 is allowed to discharge itself to begin with a voltage $V'o > Vo$, and the portion of pulse corresponding to discharge between V'o and Vo (time t') is rejected.

This is obtained by means of a generator by which rectangular pulses, having an adjustable duration, are produced synchronically with the analysis pulses. The former pulses, having a duration t', are deducted from the pulses, having a duration t, that are produced by the bistable multivibrator G. In such a case, said bistable multivibrator goes on operating, even when the voltage at the output of zeroing-limiting unit C (see FIG. 2) is higher than Vo (but always lower than V'o, due to the voltage limiter) and the operation will be correct in each case.

The voltage pulses having a duration t—t', when applied to a grid of a normally locked pentode, are converted into current pulses having a charge proportional to the absorptivity.

The electric charges carried by the pulses, are stored in a condenser, which corresponds to an approximate integration.

The voltage at the terminals of the integration condenser is applied to the vertical deflection plates of cathode ray tube R.

The integration is cancelled when the light impervious strip 6 is passed across the slit (FIG. 1), whereby the light coming from the source 7 is cut off, the cancellation pulse being produced by a monostable multivibrator, that is synchronized with the motion of the band to be analyzed.

The horizontal deflection is of a linear nature, and is obtained in step with the rotation of drum 3.

An auxiliary device is provided to allow the value of absorptivity to be set to zero in a pre-established zone of band support 5. This is obtained by releasing a pulse detector for a very short time, corresponding to the passage of about 2 mm. of band support across the light rays.

The moment of releasing can be changed at will, by acting on an adjustable lagging multivibrator, by which a triggering pulse is produced, which is delayed in respect to the moment wherein the integration begins. During the very short time in which the presence of pulses to be integrated are detected, the fluorescent line on the screen of cathode ray tube R is suppressed, and this allows establishment of the zone of the band support wherein a zero absorptivity is desired.

Figure 12:
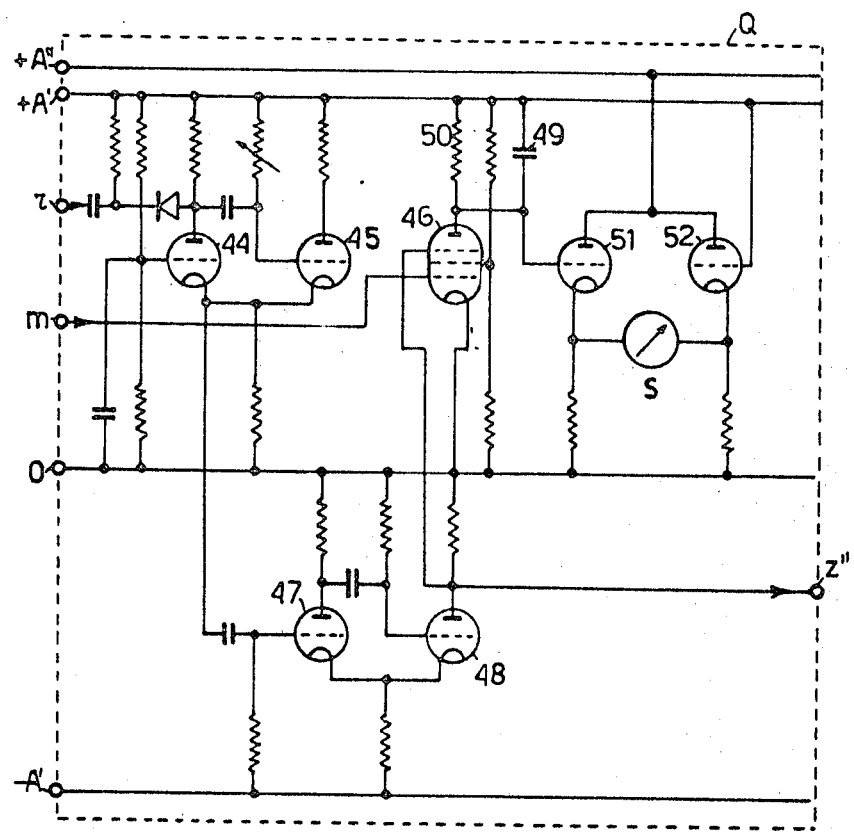
FIG. 12 is the wiring diagram of the "zero absorption detector" unit.

The cancellation of pulses is observed on an indicating instrument S (see FIGS. 12 and 13) and is obtained by controlling the gain of amplifier B in the photocell. The fluorescent line on the cathode ray tube screen is discontinued also when the integration operation is being nulled.

A better understanding of the operation of the device according to the invention can be obtained by a consideration of what follows.

The signal appearing at the output of amplifier stage B of photocell 9 (see FIG. 1), is continuously proportional to optical transmission through the band support 5. The minimal transmission is equal to zero, and is obtained when the black strip 6 is passed across the light rays that are concentrated by the lens 8.

The corresponding minimal voltage level is zeroed by means of the circuit shown in FIG. 2, and that consists of condenser 17, of resistor 18 and of diode 19. The time constant (i.e. the product of the capacity of condenser 17 multiplied by the resistance 18) is large when compared with the time taken by one revolution of drum 3 which, as stated previously, is driven at the speed of 25 or 30 revolutions per second.

The voltage limiter consists of the resistor 20 and of diode 21.

The voltages applied to related grids are compared with each other by the electronic tubes 22 and 23 of the signal comparator unit D (see FIG. 4).

The signal that is applied to the grid of tube 23 is obtained by the discharge of condenser 13 across the resistor 14, forming part of the device wherein the exponential pulses are formed (see FIG. 3). When the voltage that is applied to the grid of tube 23, falls below the momentary value of the voltage produced by the zeroing-limiter unit C (see FIG. 2) and that is applied to grid of tube 22, then the comparator D will give off, as at c, a signal which is an amplified reproduction of the last portion of the discharge from the condenser 13 of unit H (FIG. 3).

Such signal, after having been amplified by the two tubes 24 and 25 of blanking pulse generator unit E (FIG. 5) causes the bistable multivibrator—comprising of electronic tubes 26 and 27, as well as the tube 28, by which time modulated pulses are given off—to be pulsed into another state.

Analyzing pulses are produced, at a sufficiently high frequency, by an astable multivibrator F (FIG. 13) whose wiring diagram is not shown, as being of a conventional, well-known design, thereby permitting an analysis of the band support at intervals of about 0.5 mm.

An analysis pulse causes the electronic tube 26 to become non-conductive, whilst the tube 27 becomes conductive; thus, the cathode potential of tube 28 is abruptly lowered; the diode 15 (see FIG. 3) becomes non-conductive, and its anode falls below zero volts. The condenser 13 is exponentially discharged across the resistance 14.

When a pulse produced by the signal comparator through the amplifier unit E (FIG. 5) comes across f (FIG. 6), then the bistable multivibrator G is forced back to its initial state, the cathode potential of tube 28 is abruptly increased, and the condenser 13 (FIG. 3) is again charged through the diode 15.

The positive pulse that appears at the plate of tube 27 will have a duration proportional to the discharge time of condenser 13 (FIG. 3).

As previously explained, it is expedient that the charge of said condenser 13 is started at a voltage V'o higher than the voltage Vo that is present at the output of zeroing-limiting unit C in correspondence to the band support section for which a zero absorptivity is assumed.

Figure 8:
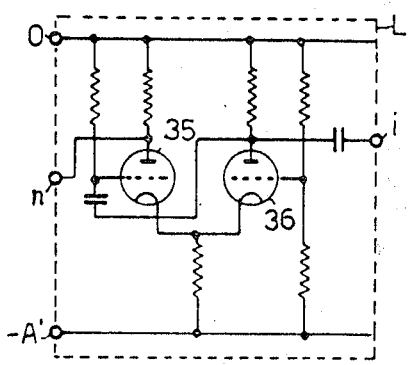
FIG. 8 is the wiring diagram of the "zero-absorption" pulse generator.

Thus, the portion of the time modulated pulse, that corresponds to the discharge of condenser 13 from V'o to Vo is blanked. Such operation is obtained by the impulse-difference generator unit I, and zero-absorption pulse generator L (see FIGS. 7 and 8).

Rectangular pulses, whose duration can be adjusted according to analysis pulses, are produced by the single pulse multivibrator or unit L. Such pulses are mixed with the time-modulated pulses, that are produced by the unit G (FIG. 6). Pulses having a duration proportional to absorptivity of band support, appear on the plate of tube 30 (see FIG. 7).

Figure 9:
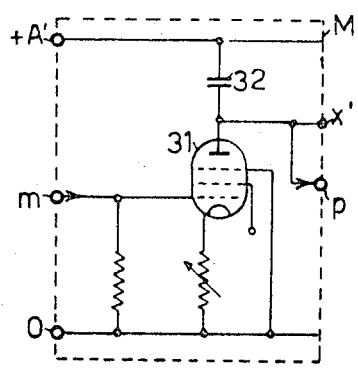
FIG. 9 is the wiring diagram of the integrator unit.

Such voltage pulses will cause the normally non-conductive pentode 31 of integrator unit M (FIG. 9) to become conductive, and are converted into pulses of anode current by which electric charges proportional to instantaneous absorptivity of band support are carried. The condenser 32 is charged by the electric charges that are carried. The condenser 32 is charged by the electric charges that are carried by said pulses, and the signal at the terminals of said condenser will represent the (approximate) integral function of the absorptivity of the band support as a function of its length.

Figure 10:
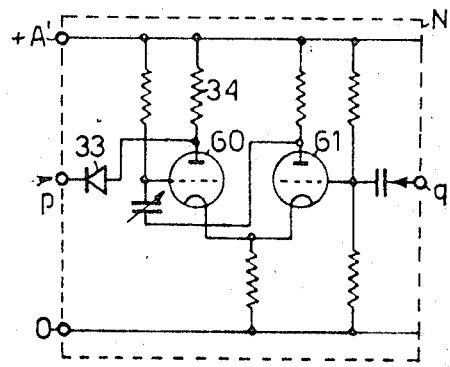
FIG. 10 is the wiring diagram of the "cancellation-integration" unit.

An integration blanking pulse is produced at each revolution of drum 3, carrying the band support 5. Thus, the condenser 32 is discharged through the diode 33 and the resistor 34 of the "blanking-integration" unit N (FIG. 10). Said blanking pulse is produced by the monostable multivibrator that is formed by the electronic tubes 60 and 61 of the unit N (see FIG. 10).

Figure 11:
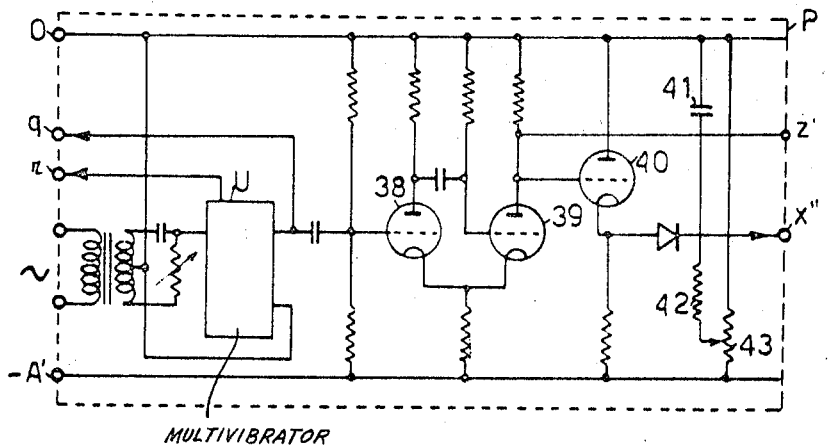
FIG. 11 is the wiring diagram of the "horizontal deflection generator" unit.

The synchronization pulses, by which the periodic blanking of integration is controlled, are produced by the "horizontal deflection generator" unit P (FIG. 11). Thus, e.g., a multivibrator unit U, syinchronized with a 50 Hz. network, will produce pulses at a frequency of 50 per sec., while a frequency divider, embodied in same unit U, is designed to produce pulses at a frequency of 25 per second, and by which the blanking of integration is controlled.

The generator of linear base time, by which the horizontal deflection signal of cathode ray tube R is produced, is also synchronized by said pulses. The horizontal deflection generator consists of the circuit comprising of electronic tubes 38, 39 and 40. The discharge of condenser 41 across the resistors 42–43 is utilized. The condenser 41 is periodically charged again by the pulses that are generated by the multivibrator embodying the tubes 38 and 39.

The signal Z' is a pluse by which the fluorescent spot can be seen at the backward bend of the curve on the cathode ray tube screen.

The "zero absorptivity detector" unit G (see FIG. 12) permits setting the absorptivity at zero in a pre-established portion of the band support to be analyzed. Said unit consists of a single-pulse multivibrator, comprising of the electronic tubes 44 and 45, and by which an adjustable time pulse is produced, such pulses being synchronized with the pulses that are produced by the horizontal deflection generator P (see FIG. 11). The pulses produced by the pulse-difference generator unit I (FIG. 7) are applied to the control grid of pentode 46; however, a flow of node current exists only when the positive pulse that is produced by the tubes 47–48 is applied to the suppressor grid. The during of such pulses is equal to the time required for the analysis of about 2 mm. of the band support. The position of support portion which is being analyzed depends on the duration of the pulse produced by the circuit comprising of electronic tubes 44 and 45.

The capacitor 49 is charged by the pulses of anode current of tube 46, and is discharged across the resistor 50; a voltage proportional to the charge of received pulses—i.e. to the duration of such pulses—is present at the teriminals of said capacitor 49.

The light spot that appears on the cathode ray tube screen corresponds to the portion of the band support for which a zero absorptivity is required.

According to the second embodiment of the electronic (or equivalent) means, that are inserted between the output of photocell amplifier B, and the second pair of deflector plates of cathode ray tube R, in order to make the device according to the invention particularly suitable for the analysis of band supports whereon blood serum proteins have been deposited by electrophoresis, the use of a feeder is foreseen (not shown), which is capable of delivering, in addition to previously stated voltages, also a supplemental voltage, e.g. of +100 volts, that in the wiring diagram of FIG. 15 is indicated by the reference sign +A''.

The differences that can be noticed in said second embodiment when compared with the previously described one, mainly concern the circuitries of units shown in the FIGS. 14 to 20 inclusive, as well as the mutual connection of same units, as stated in more detail later on.

The "synchronism separator" unit $T_0$ (FIG. 14) is a normally non-conductive amplifier, of the already well-known type, that receives from b' a signal produced by the photocell amplifier B, and that shows a phase opposite to that which is fed, through c, to "signal comparator" D. When the black strip 6, carried by the rotary drum, is passed across the lighted slit 2, a positive pulse is produced, by which the synchronism separator is made conductive, the level of signals that are produced by the stains on the band support being insufficient to make the synchronism separator $T_0$ conductive. The synchronism pulse, after having been separated from the remaining signal, is transmitted through s to six single-pulse multivibrators $T_1$, $T_2$, $T_3$, $T_4$, $T_5$ and $T_6$, of the already known type, and by which electric pulses having an adjustable duration are produced. At the end of said pulses, short triggering pulses are generated, by differentiation, in the following sequence:

$t_1$ beginning of band analysis, $t_2$ end of the analysis of the first length, and beginning of the analysis of the second length, $t_3$ end of the analysis of the second length, and beginning of the analysis of the third length, $t_4$ end of the analysis of the third length, and beginning of the analysis of fourth length, $t_5$ end of the analysis of the fourth length, and beginning of the analysis of the fifth length, $t_6$ end of band analysis, $t'_1$ triggering pulse of multivibrator in the time interval wherein the zero absorptivity is measured, $t'_2$ end of the correction of the first length, $t''_1$ beginning of horizontal deflection, $t'_6$ end of horizontal deflection.

Short discontinuations of the curve on the cathode ray screen are caused by the pulses $t_2$, $t_3$, $t_4$ and $t_5$, and such discontinuations may be conveniently located in coincidence with the zones by which the stains on the band support are separated.

When the absorptivity integral curve is projected on the screen of cathode ray tube R, then the integration limits are positioned in coincidence with the curve bands, while when the absorptivity curve is projected, the inegration limits will be positioned in coincidence with the relative minima of said curve.

The integration limit pulses are fed through $t_1$, $t_2$, $t_3$, $t_4$, $t_5$ and $t_6$, to $K_1$ and $K_2$ sections of three-way change-over switch K of the "integrator and integration cancelling" unit M'–N' (see FIG. 15).

When the change-over switch K is in the position *int.* (integration), then the bistable multivibrator (flip-flop) 60 is pulsed into another state by the limit pulses $t_1$ to $t_6$, whereby the integrator valve 54 is made conductive in the time interval between the arrival of the first and of the last limit pulses. The time modulated pulses, produced by the "difference pulse generator" I, are fed through $m$ to the cathode of valve 54, whereby it is made conductive. The capacitor 66 is charged by the current pulses coming from said valve 54, whereby a vertical deflection signal will be present at the terminals of said capacitor. Said signal is then fed, after having been suitably amplified, to cathode ray tube R. The curve that appears on the screen of R, is thus the integral curve of the absorptivity.

In the time interval between the arrival of a limit pulse through $T_6$, and the next limit pulse through $t_1$, the valves 54 and 55 are made conductive, the anode potential of valve 55 is increased, and the capacitor 66 is discharged across the diode 67 and the resistance 68.. The previous integration is blanked, and the circuit is brought back to its initial conditions. The curve will appear on the screen of cathode ray tube R during the integration time interval only. The electronic beam, emanating from the cathode ray tube, is stopped by a negative pulse $z'$, produced by the multivibrator 60.

The current that flows through the valve 54 depends on the value of resistor 61, and on the potential of the cathodes of valves 56 and 57. Usually, the valve 56 is conductive, while the valve 57 is non-conductive. When the albumin analysis is carried out (albumins are preferably found on the first stain of band support), a positive pulse is produced by the bistable multivibrator 59, that is controlled by the triggering pulses, successively coming from V, through $v$, and from T, through $t'_2$. The positive peak of the pulse produced by 59, takes the value of potential of the slider of potentiometer 65, due to the circuit comprising diode 62, condenser 63 and resistor 64. During the peak period of said pulse, the valve 57 is conductive, and a decrease occurs both in the voltage at the terminals of resistor 61, and in the current flowing through the integrator valve 54. The potentiometer 65 can thus be fitted with a dial having a graduation whereon the albumin correction percentage can be directly read.

The digital reading of percentages of the fractions that have been seperated by electrophoresis on the band support, is obtained by throwing the change-over switch K firstly in the position *cal*, which is the calibration position; under such conditions, the valve 54 is conductive in the presence of pulses coming from I', through $m$, and during the analysis of the whole length of the electrophoresis band; the condenser 73 is charged by the current pulses of valve 54, and is continuously discharged through the resistor 72. An equilibrium condition is attained in the steady state, and the average voltage, at the terminals of 73, is proportional to the global charge of all the current pulses that are transmitted by the valve 54 in the course of the analysis of the whole electrophoresis band. Such voltage will be thus proportional to the total amount of dye that is deposited on the band support. Under such conditions, the slider of linear potentiometer 74 is moved down to its limit position (when seen as in FIG. 15), that corresponds to a reading of 100, and the voltage indicated by voltmeter 71 is zeroed by means of the calibrating potentiometer 75.

When like characteristics are shown by the valves 69 and 76, then their grid voltages will also be equal.

By placing the changeover switch in the position I, then the integrator valve 54 will be conductive during the analysis of the first discrete length only of the band support, and the voltage present at the terminals of condenser 73 will be proportional to the amount of dye which is present in the first stain. By resetting to zero the reading of voltmeter 71 by means of the potentiometer 74, then the percentage of dye present in the first stain, or the percentual amount of the first fraction that has been separated on the band support, can be directly read on the dial of said potentiometer. By successively placing the changeover switch in the positions II, III, IV and V, and repeating each time the above-described operations for the reading of fraction I, the percentages of related fractions can be obtained.

The novel "difference-pulse generator" I' (FIG. 16) operates in a manner similar to that of generator I of the first embodiment; however, it only receives, through 1, the negative pulse that is produced by the multivibrator G, and by a negative output pulse having a duration $t-t'$, and that is fed to integrator unit M'–N' (see FIG. 15), through $m$.

Figure 18:
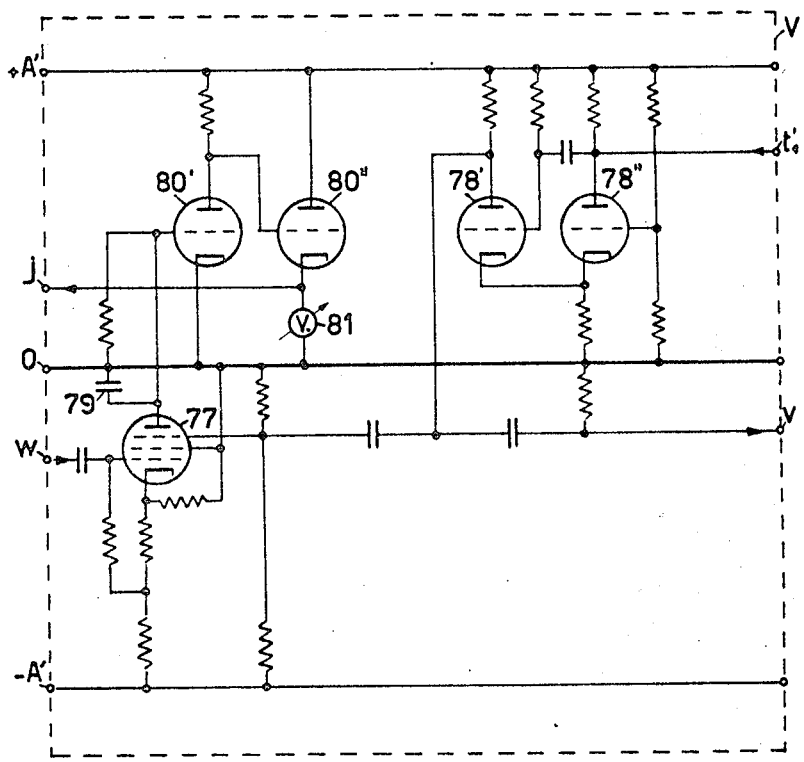
FIG. 18 is the wiring diagram of a "zero-absorption automatic control" unit.

The new "zero absorption pulse generator" L' (FIG. 17) gives a pulse whose duration depends on the voltage that is applied through J, and that is produced by the "zero absorption automatic control" V (see FIG. 18).

The output signal of unit I' (see FIG. 16), that is fed to the grid of the double control valve 77 of the unit V, through $v$, consists of a series of positive pulses having a duration $t-t'$; such pulses cause the valve 77 to become conductive only when a rectangular positive pulse, produced when the initial length of band support, directly before the first stain is being analyzed, is applied to the third grid thereof.

The gating pulses are produced by the single-pulse multivibrator that consists of the valves 78' and 78'', and o fthe related circuit. Said multivibrator is excited by the triggering pulses that are fed thereto by the unit T (FIG. 14) through $t'_1$.

While the band portions that are directly before the stains are being analyzed, pulses having a duration $t-t'=0$ are to be produced at the outputs $m$ and $n$ of the unit I' (FIG. 16), since this is equivalent to considering as wholly transparent the not stained portions of the band support. If the duration of said pulses is different from zero, then the average current flowing through the plate circuit of valve 77 (FIG. 18) will cause a decrease in the voltage present at the terminals of condenser 79. Such change in the voltage is amplified and reversed by means of the valve 80', and is transmitted, by the cathode repeater 80'', to the unit L' (FIG. 17). The duration of the pulses produced by L' increases, until reducing to zero the duration of pulses that are produced by I' (FIG. 16) in the time interval that corresponds to the analysis of the first band portion, directly before the stains.

The voltmeter 81, in the unit V (FIG. 18) permits ascertaining if the zero absorption devise is in its operating range.

Figure 19:
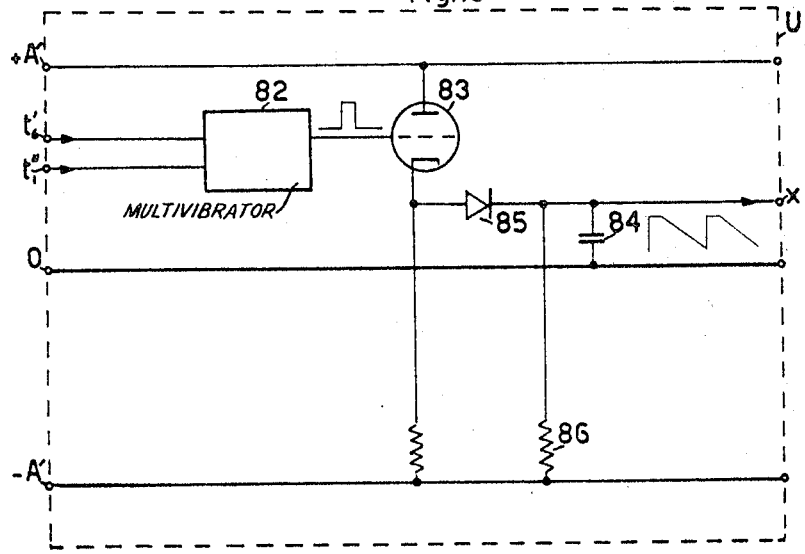
FIG. 19 is a wiring diagram of the "horizontal deflection generator unit," such unit being a variant of that shown in FIG. 11.

The final and initial pulses produced by the unit T (see FIG. 14) and transmitted through $t'_6$ and $t''_1$ are received by the "horizontal deflection generator unit" U (see FIG. 19). The bistable multivibrator 82 is excited by said pulses, whereby a rectangular positive pulse is produced in the time interval between the end of a band analysis and the beginning of the next analysis. Said pulse, applied to the grid of valve 83, is reproduced in the cathode thereof, and the condenser 84 is thereby charged through the diode 85. After the end of said pulse, the condenser 84 is discharged almost linearly through the resistor 86, and such signal can be possibly transmitted, through a suitable amplifier, to the pair of horizontal deflection plates of cathode ray tube R.

The above described units are equipped with electronic tube circuits. However, transistors may be partly or wholly substituted for said electronic tubes, after the circuit components have been suitably adapted and modified.

What I claim is:

1. A process of giving a graphical representation of the relative amounts of color deposited as bands of stain on a strip, comprising the steps of:

scanning the strip cyclically with a beam of light to produce a continuous output signal which is proportional to the transparency of the scanned strip, interrupting at each cycle the said beam of light by means of a band impervious to light, transforming said output signal into pulses of electric charges logarithmically modulated in duration, summing said electric charges with an integrator circuit during a time interval corresponding to the scanning of the stained portion of said analyzed strip to form an approximate integral function, sending said approximate integral function signal to a pair of deflecting plates of a cathode ray tube, producing a saw-tooth signal synchronized with the scanning of the strip, sending said saw-tooth signal to a second pair of deflecting plates of the said cathode ray tube, nullifying the said approximate integral function signal at the end of each cycle of analysis, suppressing the beam of the said cathode ray tube while the said approximate integral function signal is nullified, and cutting off said integrator circuit during the zeroing of the said approximate integral function signal, the off-interval time including the scanning of the said light-impervious band.

2. A process as claimed in claim 1, and placing a band impervious to light in the scanning device in order to extinguish the beam of light at the beginning of each cycle of analysis, setting to a fixed level the output signal obtained by scanning the strip when the said beam of light is interrupted by the said band impervious to light, comparing at regular intervals of time the said output signal to the signal level reached at the terminals of a capacitor previously charged to a given extent and freely discharging through a resistor, producing a trigger pulse when the said output signal and the signal at the terminals of the said capacitor are substantially equal, resetting a bistable multivibrator with the said trigger pulse, the said multivibrator having been initially switched at the instant when the discharge of the said capacitor began, coupling with a device which isolates the said capacitor from the said bistable multivibrator at the instant when this is initially switched and which allows the initial charge to be restored in the said capacitor when the said bistable multivibrator is reset by the said trigger pulse, obtaining a pulse from the said bistable multivibrator lasting as long as the free discharge of the said capacitor, generating a pulse of fixed and adjustable duration at the same times at which the said bistable multivibrator is initially switched, subtracting the said pulse of fixed and adjustable duration from the pulse obtained from the said bistable multivibrator in order to have a difference pulse of shorter duration whereby adjustment of the duration of the said fixed and adjustable pulse produces said difference pulses of nearly zero duration in the correspondence to the said output signal when a portion of the scanned strip is analyzed, detecting the said pulses of nearly zero duration during the analysis of the said portion of the strip, and sending the detected signal to an electric meter in order to show the zero.

3. A process as claimed in claim 2, and producing a pulse of given duration synchronously with the scanning of the strip, positioning the said pulse in correspondence with the analysis of a given portion of the strip, switching on an auxiliary integrating device normally cut off, with said pulse, sending the logarithmically modulated pulses to the said auxiliary integrator, using the output signal of the said auxiliary integrator to control automatically the duration of the pulses of fixed and adjustable duration in order to have pulses logarithmically modulated in duration of nearly zero duration in correspondence to the analysis of the chosen portion of the scanned strip, and interrupting the electron beam of the cathode ray tube in the time interval during which the said auxiliary integrator is switched on.

4. A process as claimed in claim 1, and producing a trigger pulse synchronously with the analysis of the band impervious to light, switching with said trigger pulse several single pulse multivibrators which generate pulses of adjustable duration, generating integration limit pulses of very short duration in correspondence to the end of the pulses generated by the said single pulse multivibrators, selecting pairs of the said integration limit pulses, sending said selected pairs of integration limit pulses to a gate pulse generator, switching on the integrator circuit by means of the said integration limit pulses, directing the electronic beam of the cathode ray tube onto the fluorescent screen during the operation of the said integrator circuit, and suppressing the electronic beam of the cathode ray tube with the said short rectangular pulses.

5. A process as claimed in claim 4, and sending said pairs of integration limit pulses to a gate pulse generator, sending the pulse generated by the said gate pulse generator to an amplitude regulator, and controlling the sensitivity of the integrator circuit with the said gate pulses from the said amplitude regulator.

6. A process as claimed in claim 5, and continuously discharging the storage capacitor of the integrator circuit through a fixed resistor forming together with the said capacitor an RC circuit of great time constant compared to the scanning period, and measuring the output of the said integrator circuit.

References Cited

UNITED STATES PATENTS

| | | | |
|---|---|---|---|
| 2,361,447 | 10/1944 | Baker | 88—14 |
| 3,096,137 | 7/1963 | Silard | 88—14 |
| 3,347,131 | 10/1967 | Clauer et al. | 250—219 |

JAMES W. LAWRENCE, Primary Examiner

DAVID O'REILLY, Assistant Examiner

U.S. Cl. X.R.

250—226; 356—203